United States Patent [19]
Allen

[11] 4,003,325
[45] * Jan. 18, 1977

[54] CARGO VESSEL LOW RESISTANCE BOW

[76] Inventor: Rudolph A. Allen, 1419 Second West, No. 303, Seattle, Wash. 98119

[ * ] Notice: The portion of the term of this patent subsequent to Jan. 27, 1993, has been disclaimed.

[22] Filed: Mar. 24, 1975

[21] Appl. No.: 561,290

[52] U.S. Cl. .............................. 114/56; 114/67 R
[51] Int. Cl.$^2$ ......................................... B63B 1/00
[58] Field of Search .......................... 114/40–43, 114/56, 63, 65 R, 67 R, 72, 73, 77 R, 77 A, 126

[56] References Cited
FOREIGN PATENTS OR APPLICATIONS

| 880,165 | 3/1943 | France | 114/56 |
| 1,317,347 | 1/1963 | France | 114/56 |

Primary Examiner—Trygve M. Blix
Assistant Examiner—Jesus D. Sotelo
Attorney, Agent, or Firm—Christensen, O'Connor, Garrison & Havelka

[57] ABSTRACT

A cargo vessel hull bow configuration comprising a horizontal forwardly projecting bow wave making bottom plate disposed substantially coplanar with the bottom surface of the hull proper, of a transverse maximum width approximately one-third the hull width and carried in that position by central support means conducive to a flow pattern extending over the plate diverging both laterally to merge smoothly with laminar flow along the tapered bow sides and downwardly to merge smoothly with laminar flow along the hull bottom. Reduction in transverse width of said wave making plate aft of its fore-and-aft point of maximum width cooperates in the formation of such laminar flow pattern, and, in conjunction with a secondary bow wave formed by the hydrodynamic effect of the plate superimposed on the normal bow wave effect of the hull proper minimizes the resultant bow wave and greatly reduces resistance to forward movement of the composite hull. It also considerably increases safely attainable forward hull speeds in terms of reduced buffeting and over stressing of the bow structure and of the seakeeping characteristics of the hull at the bow.

13 Claims, 11 Drawing Figures

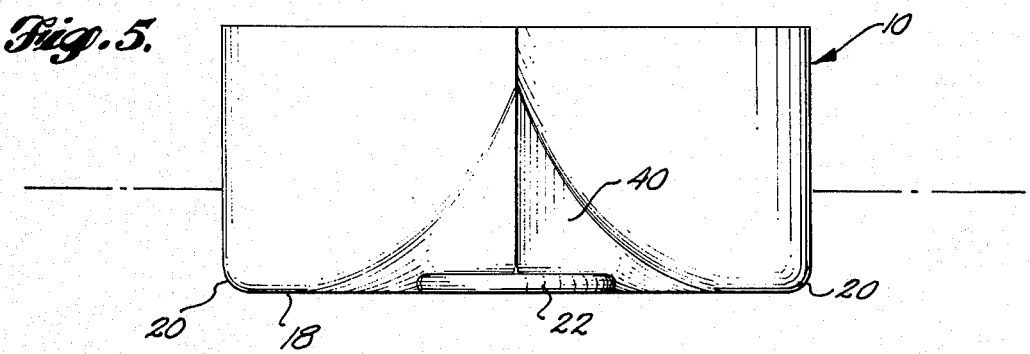
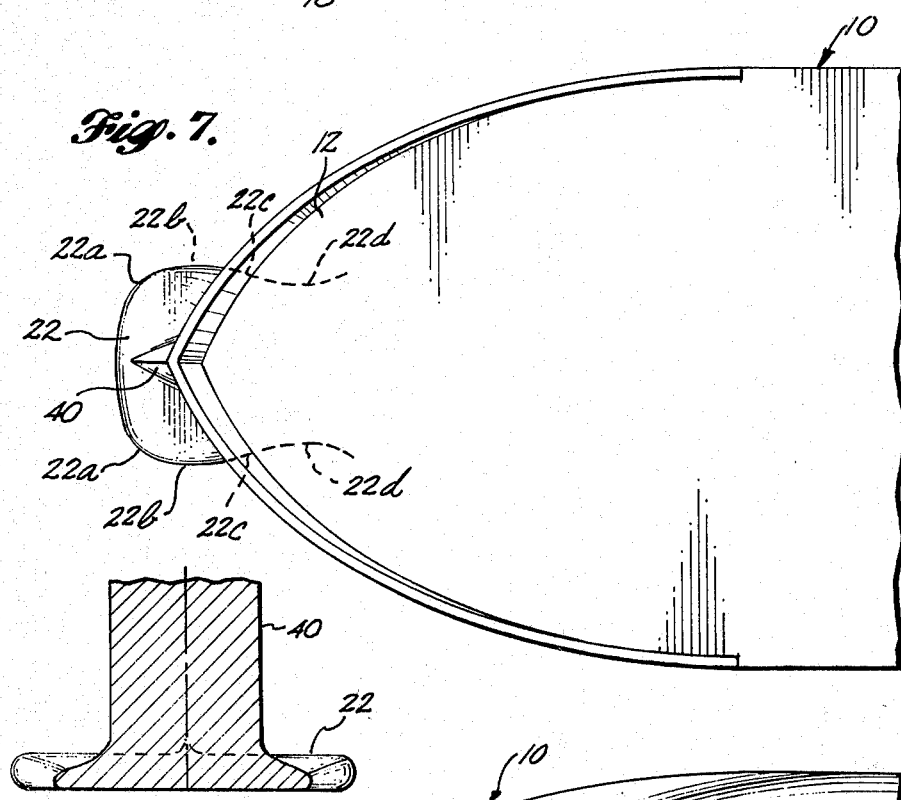
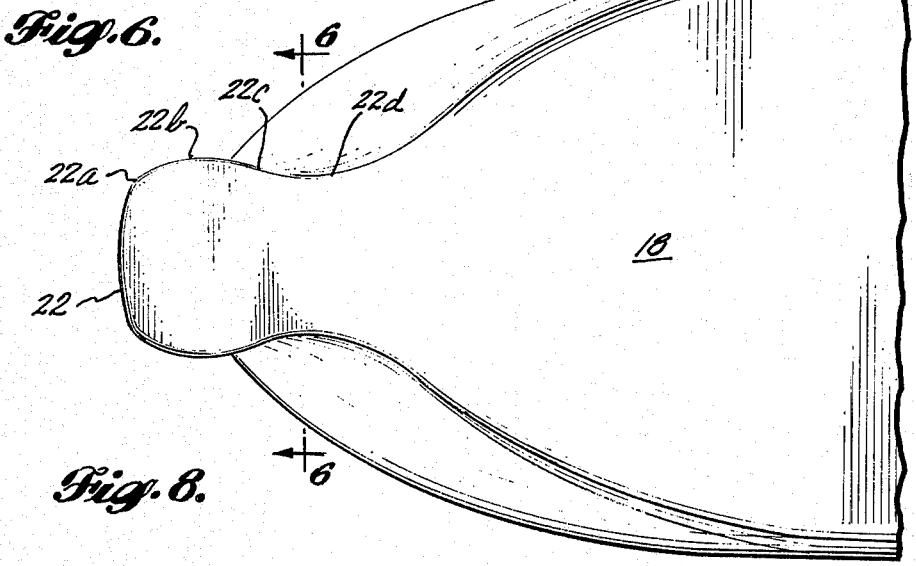

CARGO VESSEL LOW RESISTANCE BOW

BACKGROUND OF THE INVENTION

This invention relates to a new and improved shallow draft cargo vessel bow configuration employing a forwardly projecting, horizontally disposed bow plate configuration constituting an improvement over that disclosed in my copending application Ser. No. 489,762, filed July 18, 1974, now U.S. Pat. No. 3,934,531. More specifically the invention is directed to and is herein illustratively described in connection with a cargo barge spoon bow type vessel having an elongated hull proper with a substantially flat bottom and a forwardly tapered spoon bow proper, as a means of increasing the safe operating speed of such a hull while greatly reducing the drag and horsepower requirements of propelling or towing the same under varying conditions of loading. However the invention applies to ship's hull configurations of other types as well. The invention is herein illustratively described by reference to the presently preferred embodiment thereof; however, it will be recognized that certain modifications and changes therein with respect to details may be made without departing from the essential features involved.

Of interest as background herein is U.S. Pat. No. 3,410,240 to Hutchison et al. which discloses a hull form for a marine vessel having a blunt bow in which a lower portion of the bow is extended longitudinally forward of the forward perpendicular to form a smooth protuberance and wherein the hull has a flame extending aft from the bow in a downward direction and terminating in the bottom of the vessel. Also as background interest is the splash or protector plate concept disclosed in the Gavois French patent No. 1,317,347 wherein the plate is mounted at a median height on the bow proper. The commonly used bulbous bow protuberance on otherwise conventional large ocean going vessels is of further interest, such bow bottom extensions serving primarily to increase characteristic displacement hull speed, although not materially affecting basic performance and pitch stability of the hull.

In accordance with the present invention the improved bow empennage configuration is directed to achieving not only improved pitch stability and some increase of basic characteristic displacement hull speed but also, and primarily, greatly reducing the horsepower requirements in driving the vessel, particularly flat bottom pointed spoon bow type cargo barge hulls, while permitting those hulls to be moved through the water at higher speeds which with conventional hulls pose a safety hazard due to structural strains under slamming, pounding and buffeting conditions and due to sea-keeping problems with splash-over or submersion of the bow by plowing. It is an object hereof to provide a hull bow configuration which permits the hull of a large cargo barge, for instance, to be propelled or towed at speeds up to 18 knots or higher which would cause the bow structure of a conventional hull, designed for a maximum of 12 knots or so, to plow and to undergo unsafe excessive slamming and vibration strains likely to cause structural failure.

A further object of the invention is to devise an improved ocean going shallow draft barge bow configuration of a practical and sturdy construction not adding unduly to the cost of the barge nor requiring or entailing flume configurations or specialized interior structuring which would diminish the hold capacity of the hull.

A further object of this invention is to provide an improved flat bottom type spoon bow cargo vessel of shallow draft and maximum speed capability coupled with at least conventional roll stability and enhanced pitch stability for operation safely in varying sea and loading conditions. A further and related object is to devise such a hull configuration which operates efficiently essentially throughout its entire speed and loading range.

BRIEF DESCRIPTION OF INVENTION

In accordance with this invention a forwardly extending generally flat plate-like bow protuberance substantially coplanar with the bottom of the hull proper is supported from the bow by a centrally located, downwardly extending structural vane or strut which, pointed at its forward edge, flares aft in a filleting contour smoothly merging into the forwardly convergent hull bow sides and upwardly sweeping spoon bow bottom so as to position and stabilize the protuberance plate aginast pitching moments. In the preferred embodiments, lateral stability is afforded by the strut and/or additionally by structural juncture of the after portion of the protuberance plate with the hull proper at the intersection between the convergent bow proper sides and bottom. In the latter, most preferred case wherein the plate proper joins with the hull bottom, the plate side edges converge first rearwardly from the forward edge and then diverge rearwardly in a narrowing or waist before mergence with the hull proper. In either case, the substantial width reduction of the plate aft of its point of maximum width permits a water flow pattern passing over the plate to diverge both in a downward flow that merges in laminar fashion with water passing beneath the plate and hull proper, and in a lateral split of flow that merges smoothly, compatibly and in laminar fashion with water paralleling the sides of the tapered bow sides of the hull proper.

The effect of the bow protuberance plate disposed substantially in the plane of the bottom of the hull proper is to create a secondary or additional bow wave superimposed upon and tending to cancel the bow wave effect of the hull bow proper and in so doing to greatly reduce the composite net bow wave effect and thereby forward resistance to hull motion at all speeds and loadings. Furthermore it is found that the composite effect so changes the characteristic curve of drive power requirements as a function of increasing vessel speed, from a sharply rising exponential function to a slowly rising nearly linear function extending uninterruptedly out to the upper speed limit of the hull as a displacement hull, at which limit both curves abruptly rise due to turbulence effects when attempting to increase speed materially above effecitve hull speeds.

Furthermore, the additional benefit as aforementioned created by the plate forming the secondary or supplemental bow wave is to greatly reduce the plowing danger and also the buffeting and stresses to which the bow structure proper of the vessel is subjected at higher speeds, so that it now becomes possible for reasons indicated to operate safely and efficiently at speeds substantially half again as high as normal safe maximum velocity.

The foregoing and other features, advantages and objects of the invention will become fully evident from

DESCRIPTION OF THE DRAWINGS

FIG. 5 is a front view of the hull under conditions shown in FIG. 3.

FIG. 6 is a transverse sectional view taken on line 6—6 in FIG. 8.

FIG. 7 is a top view of the bow portion of the configuration shown in FIG. 1.

FIG. 8 is a bottom view corresponding to FIG. 7.

DETAILED DESCRIPTION OF THE PREFERRED EMBODIMENT

Figure 1:
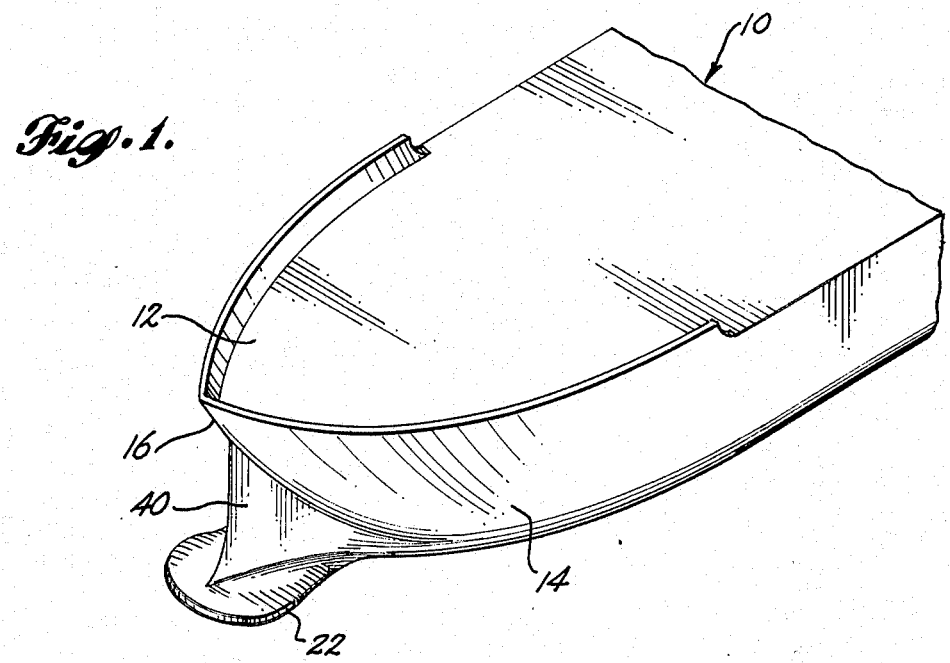
FIG. 1 is a top perspective view of the improved hull according to the invention seen from a forward aspect.
Figure 2:
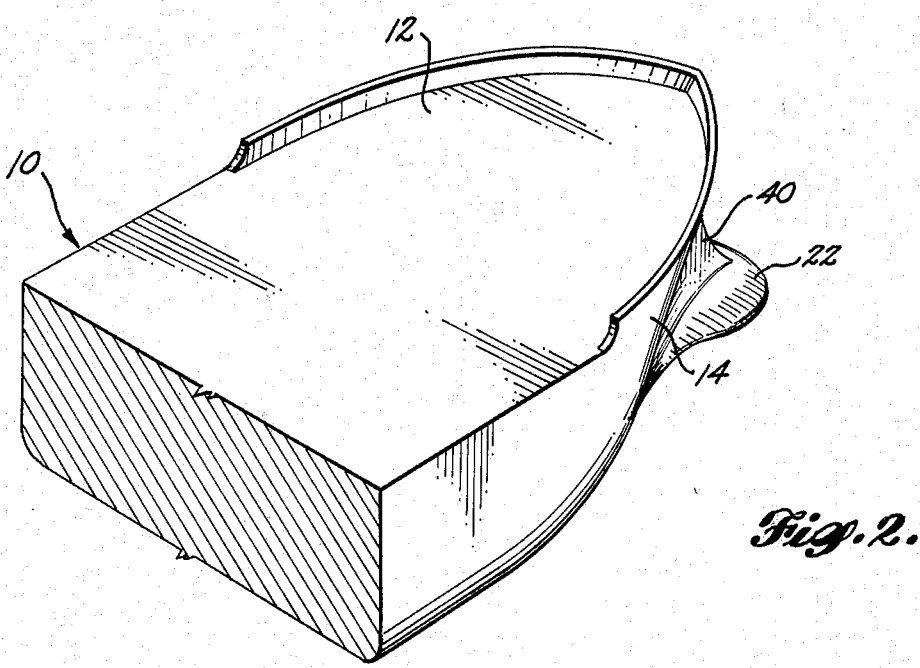
FIG. 2 is a top perspective view of the bow portion shown in FIG. 1, but seen from a rear aspect.

As shown in FIGS. 1–8, the hull proper 10 has a spoon bow 12 with forwardly convergent sides 14 and upwardly sweeping bottom plates meeting at a stem 16 and having some degree of outward and upward flare above the spoon or bottom portion for sea-keeping purposes. The hull proper sides are joined to a substantially flat hull bottom 18 with slight rounding at the chines 20. Convergent-bow shallow draft barges of this general type are in common use but have limitations of the nature previously discussed (i.e., limited safe operating speed and high horsepower requirements). However, the general technique of designing and fabricating such barge hulls may be retained in keeping with the addition of the bow empennage structure provided by this invention, provided only that the design assures adequate structural members afforded within and as part of the hull proper to which the forward protuberance plate and its support elements may be joined.

As shown the horizontally disposed forward protuberance plate 22 is disposed substantially in a plane generally coincident with the hull bottom 18, their respective bottom surfaces optimally being coplanar. The forward edge of plate 22 convexly rounded in plan, (FIG. 7). This convexity curvature of the forward side "corners" 22a continues aft to a point of maximum plate width at 22b, thence further aft to create a waist or reduction of width long the rearwardly extending sides at 22c. Continuing further aft, the plate side edges approaching mergence with the hull bottom at the sides of the hull proper flare to form a smooth junction with the sides of the hull proper at the bottom of the hull at 22d along the chine. The plate protuberance 22 is preferably of hollow construction, with skin plates at top and bottom stiffened by longitudinal and transverse filler ribs (not shown). The longitudinal ribs in the plate are cantilevered out from the bow proper or otherwise suitably mounted for strength. Vertical thickness of the plate represents a very small fraction of the total height of the hull, although under light loading conditions may occupy, submerged, as much as one-third or one-fourth the vessel's draft at the bow. Moreover the plate edges are preferably rounded in cross section as shown best in FIG. 6 in order to minimize turbulence and eddying effects.

Thickness of the protuberant plate 22 diminishes toward its trailing edge along the width-reducing curves forming the waist, at 22c, preferably with the reduction occurring by rearward descent or declination of the upper surface much the same as formation of an airfoil trailing edge, the bottom surface being preferably substantially flat an coplanar with the hull bottom throughout the extent of the plate. By forming the after edge of the bow-forming plate in the region of the waist in this manner the natural tendency of water flowing over the top surface of the plate member 22 in the region of its point of maximum width to drop or curve downwardly and flow aft in laminar fashion beneath the hull bottom proper is enhanced.

Figure 3:
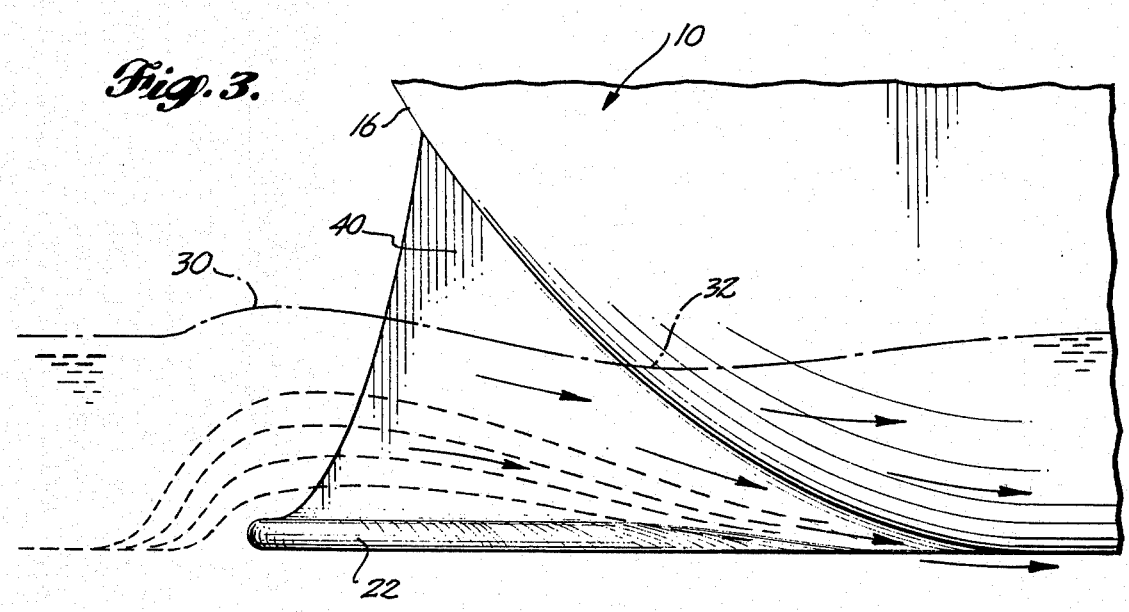
FIG. 3 is an operational side view of the bow portion moving forwardly under an assumed condition of medium to heavy loading of the hull, depicting the secondary bow wave effect and the induced subhull laminar flow created by the forwardly mounted protuberance plate structure.

Referring to FIG. 3, it will be noted that a separate or leading bow wave 30 is formed by the plate 22 ahead of the bow proper. At cruising speeds, on the back or aft side of this bow wave 30 is trough 32 presented to the forwardly convergent bow sides 14. Thus the oncoming water in the region between the secondary bow wave 30 formed above and ahead of the plate 22 follows a downwardly sloping relative flow pattern as depicted by the dotted arrows in FIG. 3 to pass beneath the bow bottom and merge in laminar fashion with water flowing directly beneath the bow plate 22 and hull proper. Such formation of a bow wave forwardly of the hull proper creates downward and lateral relative flow in the following trough in a pattern that is generally parallel to and compatible with the lines of the bow proper whether of the spoon bow shallow draft barge type or of a more conventional ocean going vessel configuration.

It will be noted however that the effectiveness of the bow plate 22 to form the secondary bow wave is achieved substantially to an optimised extent if the maximum width of the plate 22 is approximately ⅓ the full width of the bow proper. Moreover this effectiveness of the bow plate can be realized best only if there is relief, such as by providing the reduction of width or waist of at least about one-fourth behind the portion of maximum width allowing water passing over the bow plate 22 to find direct paths of flow sweeping downwardly beneath the hull proper at its bow. The bow proper impacted by a wave trough formed by the wave making plate 22 is subjected to greatly reduced forward resistance, greatly reduced buffeting and considerably less tendency for the sea to wash over the bow under open-water conditions. In order to achieve these effects it is also important to mount the bow plate 22 substantially coplanar with the bottom of the vessel as previously indicated.

Because of its location and functioning it is also necessary to provide pitching moment stabilization for the bow plate in its support from the hull. This is provided preferably by a centrally located wedge-shaped strut or fin 40 at the stem 16. This strut has vertical rearwardly divergent sides which extend downwardly from the hull bow sides 14 to the bow plate 22 as depicted in FIG. 6. Filleting in smooth curves between the after edge portions of the strut sides and the hull bow sides splits and diverts oncoming water laterally outward in smoothly laminar flow along the hull sides 14 as desired.

Figure 4:
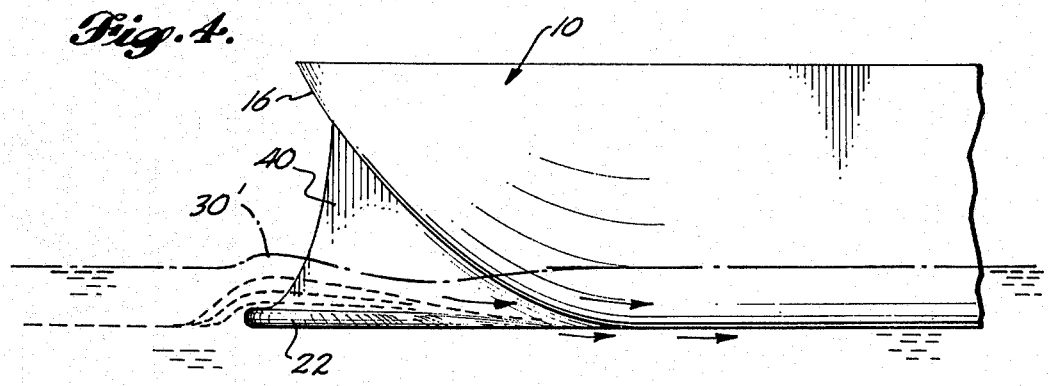
FIG. 4 is a view similar to FIG. 3 with the vessel lightly loaded.

In FIG. 4 the vessel is depicted as being more lightly loaded than in FIG. 3. The bow plate 22 thus operates nearer the surface. Nevertheless the secondary bow wave 30' this case is generally of similar form, location and effect to that in the example shown in FIG. 3 wherein the vessel is more heavily loaded. In either case the function of presenting a trough to the bow proper as the vessel advances through the water not only increases the ability of the vessel to operate at higher speeds without danger of structural damage or plowing but greatly reduces the horsepower requirements to operate the vessel at those speeds. The configuration is such that laminar flow with minimum eddying and turbulence effects is achieved at substantially all speeds within the expanded operating range afforded by the improved hull and at substantially all loadings from no load to maximum load.

Figure 9:
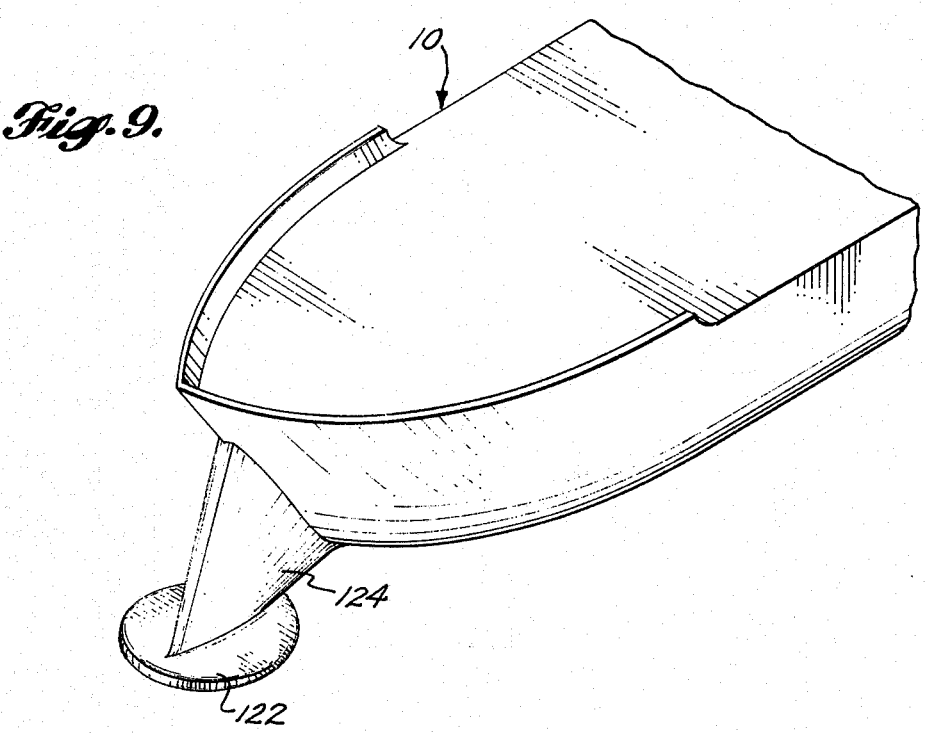
FIG. 9 is a view similar to FIG. 1 showing a modification.
Figure 10:
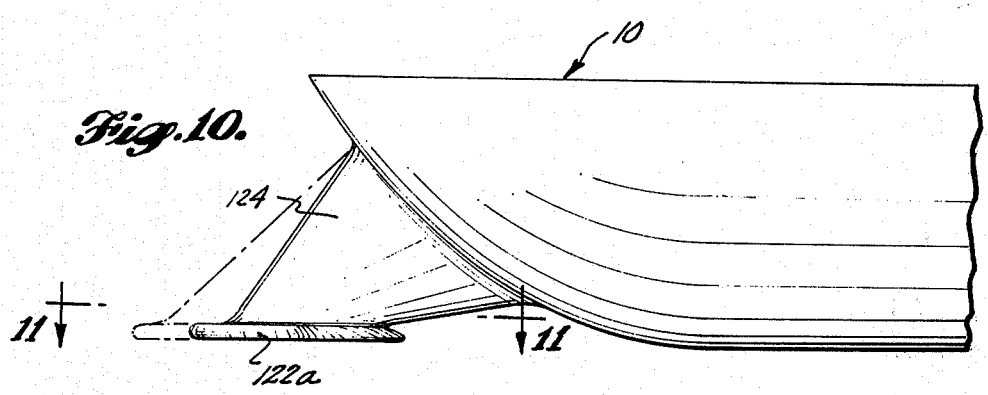
FIG. 10 is a side view of the modification shown in FIG. 9.
Figure 11:
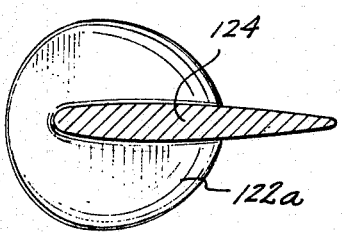
FIG. 11 is a horizontal sectional view taken on line 11—11 in FIG. 10.

In the modification shown in FIGS. 9 and 10 the disc-like bow plate or protuberance 122 is now joined directly to the vessel bottom in the horizontal plane of both in the continuous connection shown in the preceding embodiment. Instead the wave making and pitch stabilizing plate 122, now formed as a separate plate or disc, achieves essentially the same function as the configuration of FIGS. 1–8 and in essentially the same manner. The entire support for the plate in this embodiment is provided by the stabilizer strut or fin 124 which in this case has a narrower streamlined cross section as shown in FIG. 11 rather than being wedge-shaped and merged with the hull bow sides 14 as in the preceding embodiment. In this instance lateral stability for the plate 122 in a structural sense must be assumed entirely by the forwardly and downwardly projecting support fin 124. As in the previous embodiment as airfoil type after or trailing edge portion 122 is provided in which the bottom surface remains substantially coplanar throughout with the bottom plane of the vessel.

In each of the embodiments depicted, it will be seen that the forward edge portion of the wave making stabilizer plate number coplanar with the bottom of the vessel has a convexly rounded forward edge as seen in plan view and beyond its point of maximum width extending aft has side edges which converge or sweep inward rearwardly so as to allow flow of water passing over the bow plate to merge smoothly with water flowing aft under the bottom plate and joining with water flowing directly beneath the plate and hull bottom in laminar fashion. Also in each instance the support means for the protuberance or stabilizer plate permits the water to be deflected laterally outward and merge in laminar fashion compatibly with the flow along the hull sides 14.

By shifting the plate's location forwardly as shown by dotted lines in FIG. 10, the plate makes a wave cresting farther forward of the bow proper so as to position the trough correctly to the bow proper. This enables the vessel to be operated at still higher speeds.

These and other aspects of the invention will be recognized by those skilled in the art based on an understanding of the novel functions and effects of the preferred embodiments.

I claim:

1. A vessel hull comprising, in combination with a bow portion thereof including forwardly convergent sides joined to a bottom, a generally horizontally disposed wave-making plate, of a thickness a small fraction the height of the bow portion positioned generally coplanar with and forwardly of the hull bottom, said plate having a forward edge portion and aft thereof a portion of maximum transverse width several times its thickness and less than the width of the bow portion, behind which portion of maximum width the width of the plate extending aft decreases not less than by about one-fourth the maximum width at a location forwardly of the hull, and strut means joined to the bow portion structurally supporting said plate in said position, said strut means permitting water flowing relatively aft over the plate to diverge outwardly into parallel laminar flow relative to water flowing past the hull portion and downwardly over the width-reducing portion of the plate so as to pass under the hull bottom in parallel laminar flow relative to water flowing past the hull bottom directly.

2. The combination defined in claim 1, wherein the plate is joined at its after end portion to the hull portion sides adjacent the chine of the hull.

3. The combination defined in claim 2, wherein the plate has a waist of reduced width concavely curved at each side edge aft of which the width increases in merging with the bow portion.

4. The combination defined in claim 3, wherein the plate in plan is convexly rounded at its forward edge and convexly rounded at its point of maximum width in a curve at each side which continues aft into the waist.

5. The combination defined in claim 4, wherein the thickness of the plate along the curve which continues into the waist is of rearwardly decreasing value in longitudinal planes.

6. The combination defined in claim 5, wherein the bow portion is pointed above water level and the strut means is wedge-shaped in horizontal section, having an upright forward apex continuing vertically into the upper portion of the bow point and having upright sides which diverge rearwardly and form a filleted juncture with the bow portion sides.

7. The combination defined in claim 5, wherein the bottom of the plate is substantially flat throughout and the thickness reduction is formed by downward sloping of the top of the plate aft.

8. The combination defined in claim 1, wherein the plate in plan is generally of disk-like configuration having rearwardly and inwardly curved side edges lying forward of the bow portion.

9. The combination defined in claim 8 wherein the plate is reduced in thickness toward its trailing edge aft of its point of maximum width.

10. The combination defined in claim 9, wherein the bottom of the plate is substantially flat throughout and the thickness reduction is formed by downward sloping of the top of the plate aft.

11. The vessel hull defined in claim 1, wherein the bow portion is of the spoon bow configuration defined by forwardly convergent upper side surfaces and convexly rounded forwardly convergent and upwardly swept bottom surfaces joined therewith, the vessel hull bottom being generally flat as it extends aft from the bow portion.

12. The vessel hull defined in claim 1, wherein the maximum transverse width of the wave-making plate is of the order of one-third the width of the bow portion.

13. The vessel hull defined in claim 8, wherein the maximum transverse width of the wave-making plate is of the order of one-third the width of the bow portion.

* * * * *